(12) United States Patent
Saltsidis

(10) Patent No.: US 8,238,228 B2
(45) Date of Patent: Aug. 7, 2012

(54) METHOD AND SYSTEM FOR RE-ENABLING DISABLED PORTS IN A NETWORK WITH TWO PORT MAC RELAYS

(75) Inventor: Panagiotis Saltsidis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 255 days.

(21) Appl. No.: 12/373,063

(22) PCT Filed: Jul. 10, 2007

(86) PCT No.: PCT/IB2007/001930
§ 371 (c)(1),
(2), (4) Date: Jan. 9, 2009

(87) PCT Pub. No.: WO2008/007207
PCT Pub. Date: Jan. 17, 2008

(65) Prior Publication Data
US 2009/0185480 A1    Jul. 23, 2009

Related U.S. Application Data

(60) Provisional application No. 60/806,969, filed on Jul. 11, 2006.

(51) Int. Cl.
*G01R 31/08* (2006.01)
*H04L 12/28* (2006.01)

(52) U.S. Cl. ...... 370/216; 370/242; 370/252; 370/395.3
(58) Field of Classification Search .............. None
See application file for complete search history.

(56) References Cited

U.S. PATENT DOCUMENTS

| 6,868,509 | B2* | 3/2005 | Gale et al. ................. 714/43 |
| 7,075,939 | B2* | 7/2006 | Kalkunte et al. ............. 370/401 |
| 2005/0249124 | A1* | 11/2005 | Elie-Dit-Cosaque et al. 370/242 |
| 2005/0265341 | A1* | 12/2005 | Benedyk et al. ............. 370/389 |
| 2006/0007854 | A1* | 1/2006 | Yu ......................... 370/229 |
| 2006/0221841 | A1* | 10/2006 | Lee et al. .................. 370/242 |

FOREIGN PATENT DOCUMENTS
EP          1655899 A1 *   5/2006
* cited by examiner

*Primary Examiner* — Nittaya Juntima
*Assistant Examiner* — Samina Choudhry

(57) ABSTRACT

A system and method for enabling a disabled port on a device such as a Two Port Medium Access Control (MAC) Relay (TPMR), which relays MAC frames in a communication network. When a link in the network fails, the TPMR disables the port due to operation of a link failure propagation protocol. When the TPMR detects that the failed link is repaired, the TPMR stops transmitting link failure Packet Data Units (PDUs) and transmits a Link Failure Terminating PDU to other connected TPMRs in the network. Receipt of the Link Failure Terminating PDU indicates the failed link is repaired and all ports disabled as a result of the failure should consequently be enabled.

20 Claims, 7 Drawing Sheets

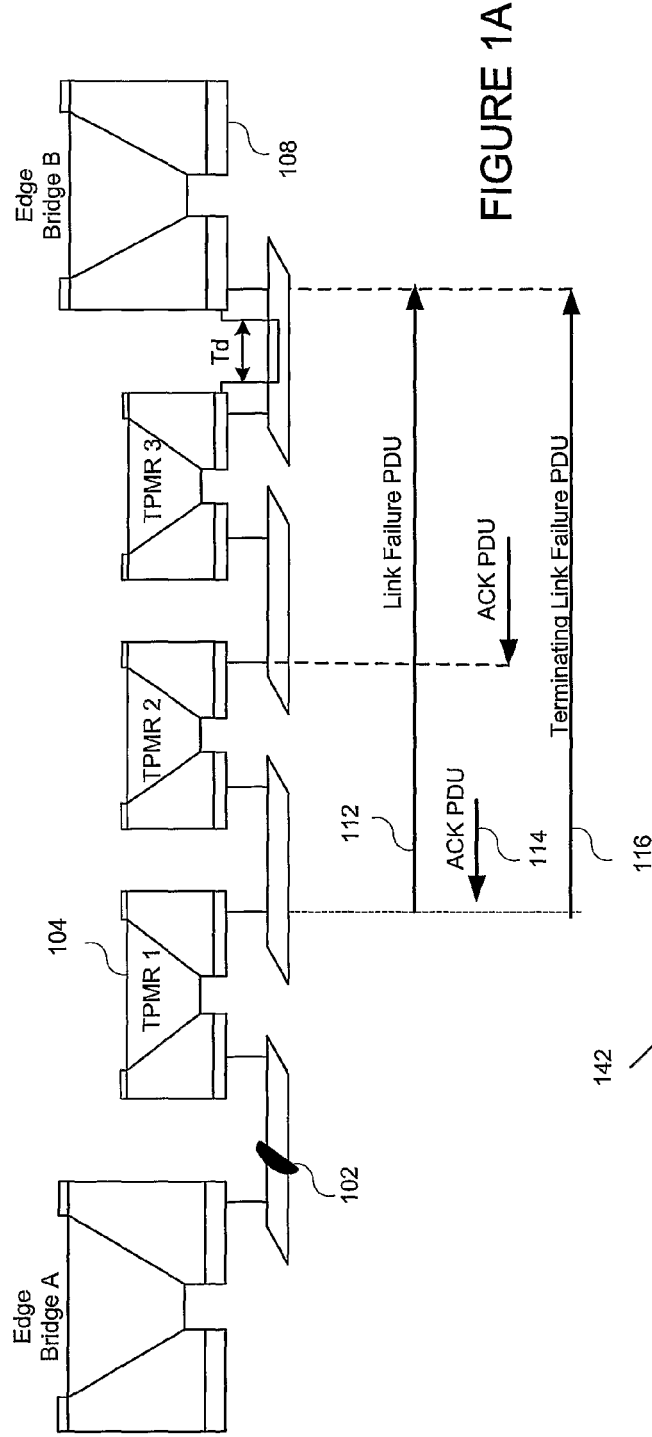
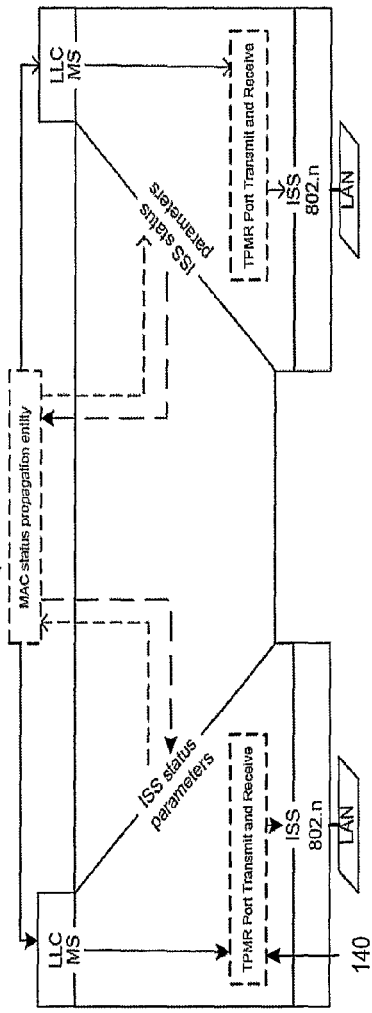
FIGURE 1A
FIGURE 1b

METHOD AND SYSTEM FOR RE-ENABLING DISABLED PORTS IN A NETWORK WITH TWO PORT MAC RELAYS

RELATED APPLICATIONS

This application claims the benefit of U.S. Provisional Application No. 60/806,969 filed Jul. 11, 2006, the disclosure of which is fully incorporated herein by reference.

TECHNICAL BACKGROUND/EXISTING TECHNOLOGY

The present invention relates in general to network and in particular link failure in the network. More particularly, the present invention relates to re-enabling devices that have been disabled and that are integral parts of the network.

Numerous vendors and potential users (Service Providers) have expressed the need to integrate Ethernet link technologies with their existing infrastructure at a low cost, while providing the manageability and remote diagnostic capabilities traditionally offered by circuit switched technologies.

The Two Port MAC Relay (TPMR) project, undertaken currently by IEEE802.1aj specifies the function of a MAC (Media Access Control) Relay with two MACs and the protocols and procedures to support its operation. A TPMR device is transparent to all frame-based media independent protocols except those explicitly addressed to this device. It is remotely manageable through at least one of its external MACs and is capable of signaling a failure of either of the MAC's connected Local Area Network (LAN) links through the other MAC in the TPMR.

The project is meant to also address issues related to link loss signaling and remote diagnosis, as the current lack of a standardized solution is impeding the growth of the demarcation device industry.

TPMR devices support, among other protocols, a link failure notification mechanism. The detection of a link failure on a port of the TPMR triggers notification of such a failure to the other port of the TPMR. In principle, if a link failure is detected on one port, the link failure propagation entity on the TPMR will periodically transmit TPMR link failure Packet Data Units (PDUs) through the other port. Once the failed link returns to normal operation, periodic transmissions of TPMR link failure frames thorough the other port is stopped. One problem is that the current state machine diagrams as described in P802.1aj/D1.4 (TPMR project) do not include a mechanism that would allow a disabled downstream port to be re-enabled if the disabled downstream port was the result of a propagating link failure PDU that does not enable the capability of responding to link failure PDUs.

SUMMARY OF THE INVENTION

It is an object of the invention to provide a method and system that allows all ports of peer entities (TPMRs, bridges, routers, i.e., any device that relays MAC frames) that are connected to a TPMR in a particular network to return to their enabled states as soon as a disabled link is repaired. As such it achieves fast recovery propagation and improves the overall service availability.

To address the above-discussed deficiencies of the prior art, a new type of link failure PDU is introduced; the Link Failure Terminating PDU (link failure and link failure acknowledgement PDUs are already defined). As soon as a TPMR detects that a failed link is fixed, the TPMR stops transmitting link failure PDUs and transmits one of the defined Link Failure Terminating PDUs. Receipt of this frame by any other connected TPMR means that the original failure is fixed and all ports that were forced to the disabled state because of the link failure PDUs, should now be enabled. This achieves fast recovery propagation and improves overall service availability

BRIEF DESCRIPTION OF THE DRAWINGS

For a more complete understanding of the present invention including its features and advantages, reference is made to the following detailed description of the invention, taken in conjunction with accompanying drawings of which:

FIG. 1a depicts a high-level block diagram of Bridge system including Two Port MAC Relays in accordance with an embodiment of the present invention;

FIG. 1b illustrates a block diagram of a TPMR for use in an embodiment of the present invention;

DETAILED DESCRIPTION OF THE INVENTION

Figure 1C:
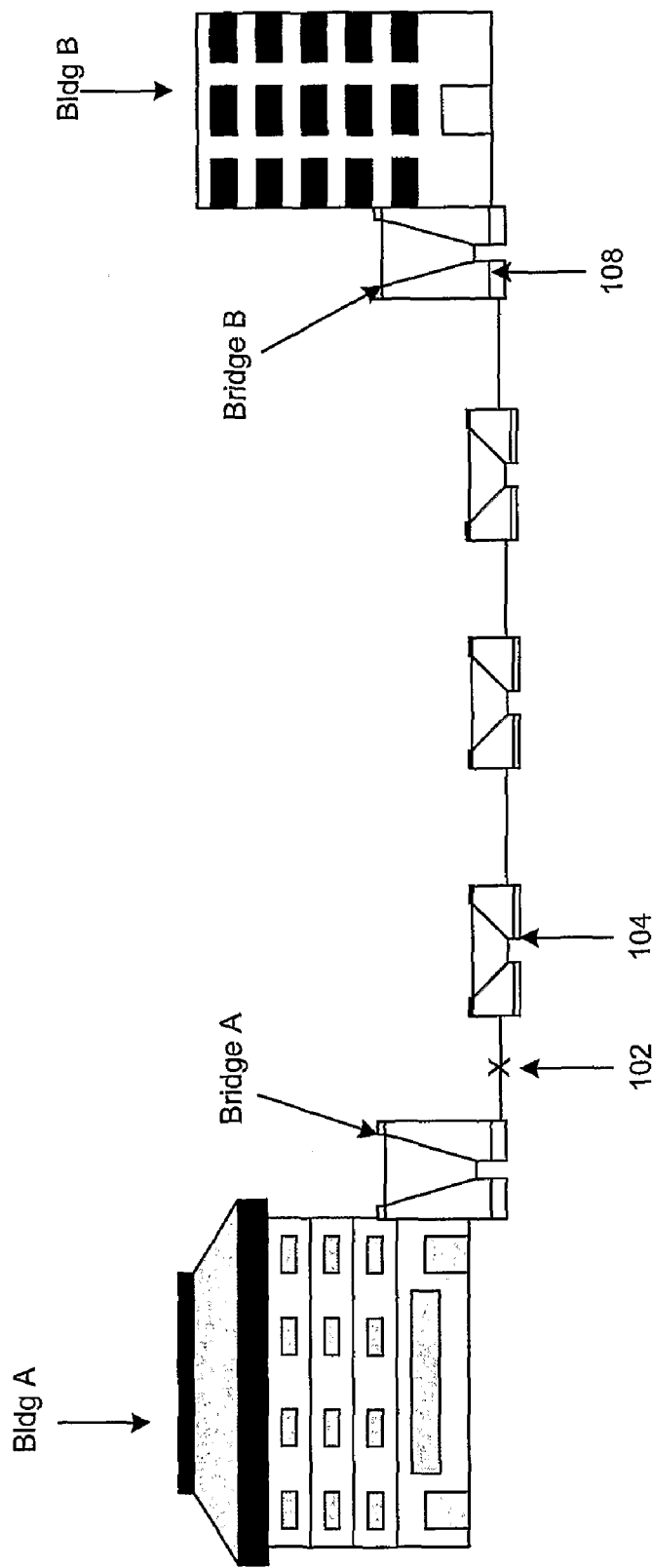
FIG. 1c depicts a high-level block diagram of TPMRs in use in a network, according to an embodiment of the present invention.

In the following description, for purposes of explanation and not limitation, specific details are set forth, such as particular architectures, interfaces, circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logic code (e.g., hardware, software, firmware, etc.), etc., are omitted so as not to obscure the description of the present invention with unnecessary detail.

A preferred embodiment of the present invention and its advantages are best understood by referring to FIGS. 1-6 of the drawings, like numerals being used for like and corresponding parts of the various drawings. With reference now to the figures, FIG. 1a illustrates a high-level block diagram of a Bridge system in an Ethernet for providing a mechanism for fast recovery of a disabled port when a failure in another port in the system is repaired.

The detection of link failure 102 (or a port failure, not shown) on one port of TPMR 104 triggers notification of the failure to the other Port of TPMR 104 (see FIG. 1b for operation of the MAC status propagation entity 142). The mechanism used to detect the link failure or port failure is not shown and is media dependent. All frames queued for transmission by the TPMR relay function are discarded while the failure persists. The detection mechanism works with either port of TPMR 104.

If the MAC_Operational parameter for one port of TPMR 104 becomes FALSE, then the MAC status propagation entity periodically transmits TPMR link failure PDUs through the other port. The frequency of transmission can be determined by management; but a default transmission frequency is one second between transmissions. Once the MAC_Operational parameter for the failed port becomes TRUE, periodic transmissions of TPMR link failure frames through the other port are stopped.

Edge Bridges A and B at either end provide management to the TPMRs. A notification of link failure by TPMR1 104, utilizing MAC status propagation entity 142 (see FIG. 1*b*) provides for transmission of TPMR link failure PDU 112 (LFPDU) through the TPMR 104 port opposite the port detecting the link failure. In the case of failure on either port, link failure is detected by the MAC status propagation entity, which is monitoring the ISS status parameters (MAC_Operational status parameters are as described in 6.4.2 of IEEE Std 802.1Q) for each port of TPMR 104.

Link failure PDUs 112 are propagated through TPMRs, but the PDUs use a group MAC address that is not propagated through Bridges (i.e., Edge Bridge A and Edge Bridge B of FIG. 1*a*). Any TPMRs that are present between the point of failure and the first Bridge port will therefore see link failure PDUs that are transmitted by the upstream TPMR, which detected the link failure and will respond by sending a link failure acknowledgement back to the originating TPMR. If the Bridge that terminates the LAN connected to TPMR1 104, implements the capability of responding to link failure PDUs, then it will send link failure acknowledgement (ACK PDU) 114 back to originating TPMR 104.

Receipt of a link failure acknowledgement by a TPMR indicates that the next device (Bridge or TPMR) downstream is aware of the link failure. Conversely, if a link failure acknowledgment is not seen by a TPMR, then it indicates that the next device (Bridge or TPMR) downstream is unaware of the link failure. In the latter case, the protocol state machines employ ISS parameter manipulation (see below) in order to signal link failure on the next LAN segment.

The periodic transmission of TPMR link failure PDUs, and the generation of link failure acknowledgements, is governed by the operation of the TPMR link failure protocol state machines (two) as defined below: the TPMR link failure protocol initiator state machine and the TPMR link failure protocol responder state machine.

A TPMR supports one instance of the TPMR link failure protocol initiator state machine and one instance of the TPMR link failure protocol responder state machine on each Port. Additionally, a Bridge that conforms to the link failure protocol as a responder on one or more Ports implements an instance of the TPMR link failure and protocol responder state machine on each Port for which conformance is claimed. The structure and encoding of TPMR link failure, Link Failure Terminating TPMR and acknowledgement PDUs is defined below.

Link Failure Notification By ISS Status Parameter Manipulation

As noted above, the operation of the MAC status propagation entity is illustrated in FIG. 1*b*. One method of link failure notification is used if link failure propagation is enabled for a particular port (in this case, port 140), and the link failure propagation method for port 140 is set to "ISS status parameters".

If the MAC_Operational parameter for port 140 of the TPMR becomes FALSE, then the MAC status propagation entity sets the MAC_Enabled parameter for the other port to FALSE. Once the MAC_Operational parameter for the failed port becomes TRUE, the MAC_Enabled parameter for the other Port is set to TRUE.

These changes in state of the MAC_Enabled parameter can be used by the underlying MAC to provide a media-dependent means of signaling link failure to any device connected to the link concerned. Such a mechanism can include MAC-specific protocols and physical layer signaling methods such as disabling light transmission or carrier transmission.

Propagation of link failures by ISS parameter manipulation is integrated into the operation of the TPMR link failure protocol initiator state machine.

FIG. 1*c* depicts a high-level block diagram of TPMRs in use in a private network, according to an embodiment of the present invention. A chain of TPMRs are included in the network and are managed by the edge Bridges A and B 108. In case of a link failure 102, for instance between Edge Bridge A and TPMR 104, the shutdown would block management view of the network. However, link failure protocol notification allows management view.

A link failure PDU is transmitted from TPMR 104 downstream to Edge Bridge B 108, which transmits back ACK PDUs. A Link Failure Terminating PDU is transmitted by the downstream leg of TPMR 104 when the link failure 102 is corrected thus allowing all downstream devices to come back.

Another link failure mechanism is through the manipulation of the ISS status parameters as discussed below. Only one of these link failure propagation mechanisms is enabled at any one time; the choice of mechanism being determined by the managing devices. The default mechanism is the transmission of TPMR link failure frames.

Figure 2:
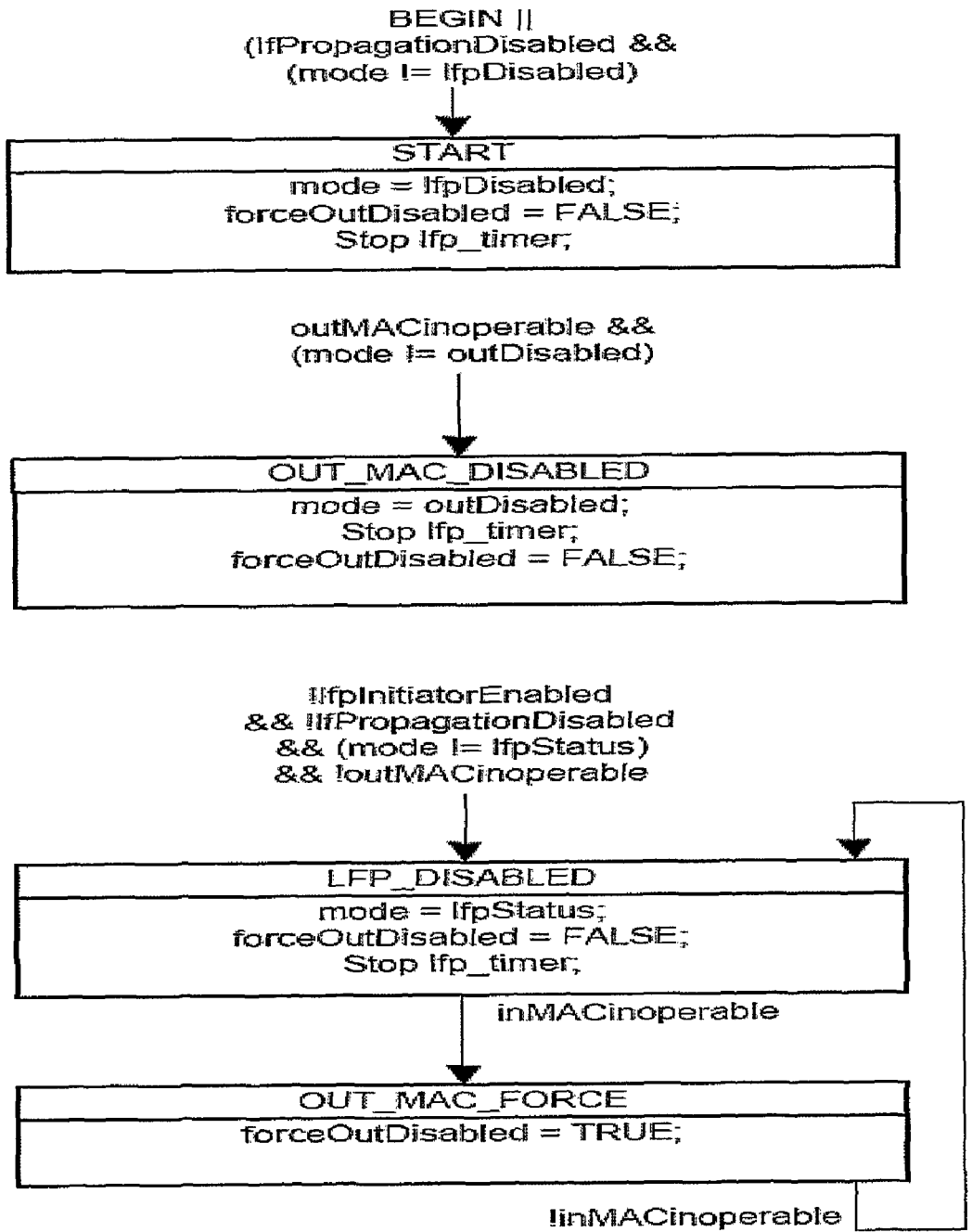
FIG. 2 and FIG. 3 illustrate a high-level block diagram of a state machine for a TPMR link failure protocol initiator according to an embodiment of the present invention.
Figure 3:
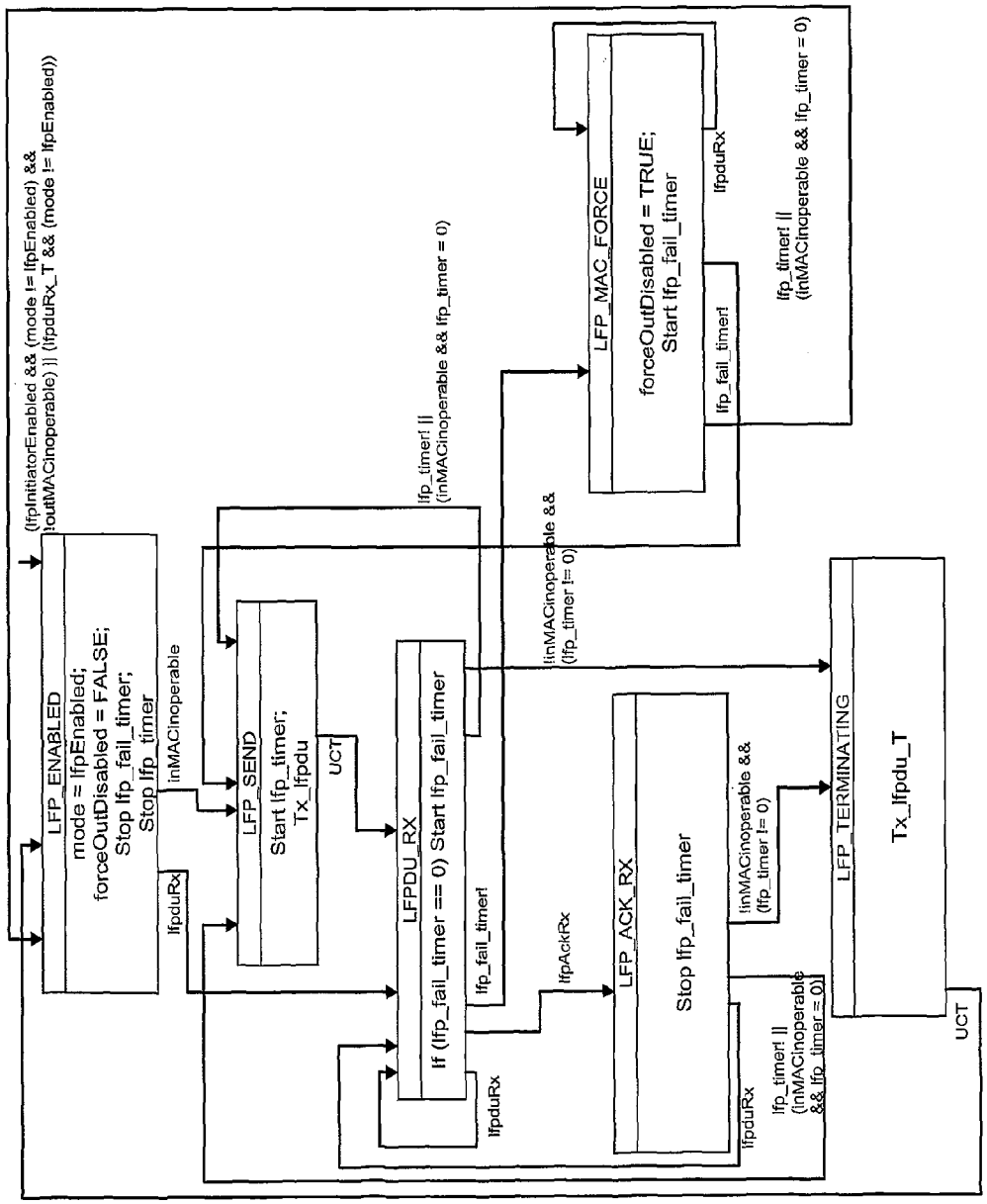

FIG. 2 and FIG. 3 illustrate parts of the state machine diagram for the operation of the TPMR failure protocol initiator state machine, according to an embodiment of the present invention. The states represented in FIG. 2 are related to the initial and disabled states. FIG. 3 depicts a link failure protocol operation in the enabled state. and the state machine diagram illustrates a mechanism that would allow a port disabled by operation of link failure propagation protocol to return to the enabled state as soon as the fault is fixed.

FIGS. 2 and 3 do not have any depicted conditions that explicitly join the states shown in them. Nevertheless conceptually they are part of the same state machine and are joined by the global conditions (the open arrows). Each state is represented in the state diagram as a rectangular box, divided into two parts by a horizontal line. The upper part contains the state identifier, written in upper case letters. The lower part contains any procedures that are executed on entry to the state.

For example if we assume that the link failure initiator state machine is in the state LFPDU_RX of FIG. 3 and the other port is disabled (not the port that is corresponding to this state machine but the other port of the TPMR) the port's link failure protocol initiator state machine will transit to the state OUT_MAC_DISABLED of FIG. 2 (the outMACinoperable variable will be set and correspondingly the global condition in FIG. 2 will be fulfilled. For every global condition, it is as if the open arrow is starting from any other possible state in FIGS. 2 and 3).

All permissible transitions between states are represented by arrows, the arrowhead denoting the direction of the possible transition. Labels attached to arrows denote the condition(s) that must be met in order for the transition to take place. All conditions are expressions that evaluate to TRUE and FALSE; if a condition evaluates to TRUE, then the condition is met. The label UCT denotes an unconditional transition (i.e., UCT always evaluates to TRUE). A transition that is global in nature (i.e., a transition that occurs from any of the possible states if the condition attached to the arrow is met) is denoted by an open arrow, i.e., no specific state is identified as the origin of the transition. When the condition associated with a global transition is met, it supersedes all other exit conditions including UCT. The special global condition BEGIN supersedes all other global conditions, and once asserted remains asserted until all state blocks have executed to the point that variable assignments and other consequences of their execution remain unchanged.

On entry to a state, the procedures defined for the state (if any) are executed exactly once, in the order that they appear in FIGS. 2 and 3. Each action is deemed to be atomic, i.e., execution of a procedure completes before the next sequential procedure starts to execute. No procedures execute outside of a state block. The procedures in only one state block execute at a time even if the conditions for execution of state blocks in different state machine are satisfied. All procedures in an executing state block complete execution before the transition to and execution of any other state block occurs, i.e., the execution of any state block appears to be atomic with respect to the execution of any other state block and the transition condition to that state from the previous state is TRUE when execution commences. The order of execution of state blocks in different state machines is undefined except as constrained by their transition conditions. A variable that is set to a particular value in a state block retains this value until a subsequent state block executes a procedure that modifies the value.

On completion of all of the procedures within a state, all exit conditions for the state (including all conditions associated with global transitions) are evaluated continuously until one of the conditions is met.

The following terms explain the state machine symbols that are used in FIGS. 2 and 3:

| | |
|---|---|
| ! | Logical NOT operator. |
| && | Logical AND operator. |
| \|\| | Logical OR operator. |
| If . . . then . . . | Conditional action - If the Boolean expression following the if evaluates to TRUE, then the action following the then is executed. |
| ! | Inequality. evaluates to TRUE if the expression to the left of the operator is not equal in value to the expression to the right. |

State diagrams are used to represent the operation of the protocol by a number of cooperating state machines, each comprising a group of connected, mutually exclusive states. Only one state of each machine can be active at any given time. As noted above "A transition that is global in nature (i.e., a transition that occurs from any of the possible states if the condition attached to the arrow is met) is denoted by an open arrow, i.e., no specific state is identified as the origin of the transition." Correspondingly the entry conditions to FIG. 3 are (IfpInitiatorEnabled && (mode !=IfpEnabled) && !outMACinoperable) || (IfpduRx_T && (mode !=IfpEnabled)). That is, the TPMR link failure protocol has been enabled by management for this port AND the other port is operable AND mode of operation is not enabled yet (which actually means that the protocol is in one of the initial states or disabled states as defined in FIG. 2) OR the terminating LFP PDU has been received and the protocol was in one of the disabled states.

TPMR Link Failure Protocol Responder State Machine

Figure 4:
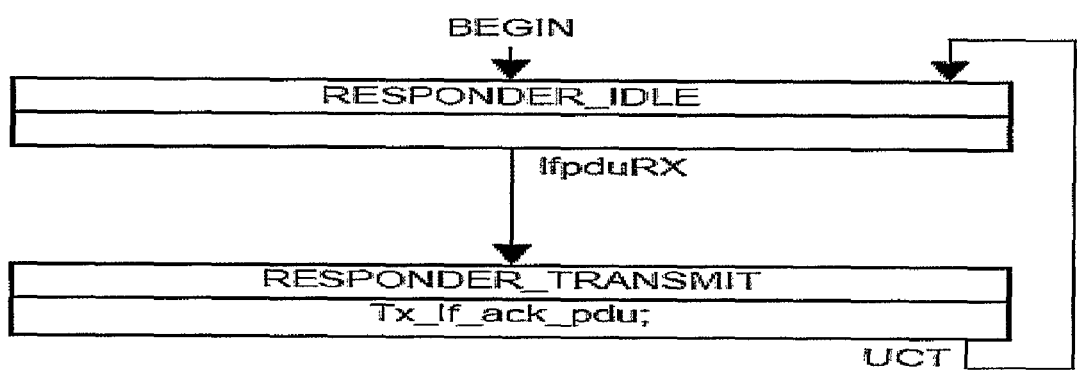
FIG. 4 depicts a state machine diagram for operation of a TPMR link failure protocol responder, according to an embodiment of the present invention.

FIG. 4 defines the state diagram for the operation of the TPMR link failure protocol responder state machine. Whenever an LFP PDU is received, an ACK PDU is sent. On initialization (BEGIN) the TPMR link failure protocol responder state machine enters the RESPONDER_IDLE state and waits for an LFP PDU. If this is received it transitions to the RESPONDER_TRANSIT state and emits an ACK PDU. After that it transitions back to the RESPONDER_IDLE state.

State Machine Variables, Events And Procedures
Begin

This is a Boolean variable controlled by the system initialization process. A value of TRUE causes all TPMR state machines to continuously execute their initial state. A value of FALSE allows all state machines to perform transition out of their initial state, in accordance with the relevant state machine definitions.

Mode

The mode of operation of the TPMR link failure protocol initiator state machine. This variable can take the following values:
 1. IfpDisabledf (0)
 2. outDisabled (1)
 3. IfpStatus (2)
 4. IfpEnabled (3)

IfpInitiatorEnabled

The value of the variable IfpInitiatorEnabled is TRUE if the operation of the TPMR link failure protocol has been enabled by management for this Port, i.e., link failure propagation is enabled for this Port, and the link failure propagation method for the Port is set to "Link failure Protocol".

The value of the variable IfpInitiatorEnabled is otherwise FALSE.

IfPropagationDisabled

The value of the variable IfpPropagationDisabled is TRUE if link failure propagation has been disabled by management for this Port. The value of the variable IfpPropagationDisabled is otherwise FALSE.

Ifp_timer_period

The value, in centiseconds, used to initialize the Ifp_timer. The default value of this variable is 1 s; this value can be changed by management.

Ifp_timer

Ifp_timer is the timer variable that controls the frequency of transmission of TPMR link failure PDUs. The timer is started, i.e., initialized, with a starting value determined by the current value of Ifp_timer_period; the timer then decrements on each timer tick until its value reaches zero, at which point a timer expiry is generated. The timer is be stopped by setting its value to zero.

IfpduRX

This event occurs when a link failure PDU is received on the Port associated with the state machine.

IfpAckRX

This event occurs when a link failure ACK PDU is received on the Port that is not associated with the state machine.

IfpduRX_T

This event occurs when a Link Failure Terminating PDU is received on the Port associated with the state machine.

OutMACinoperable

This variable takes the Boolean value TRUE if, for the Port not associated with the state machine, either of the following are true:
 1. The Mac has been administratively disabled (i.e., MAC_Enabled is FALSE (see 6.4.2 in IEEE802.1Q-2005) or,
 2. The entity providing the service is not capable of transmitting and receiving frames.

The value of this variable is otherwise FALSE.

InMACinoperable

Figure 5:
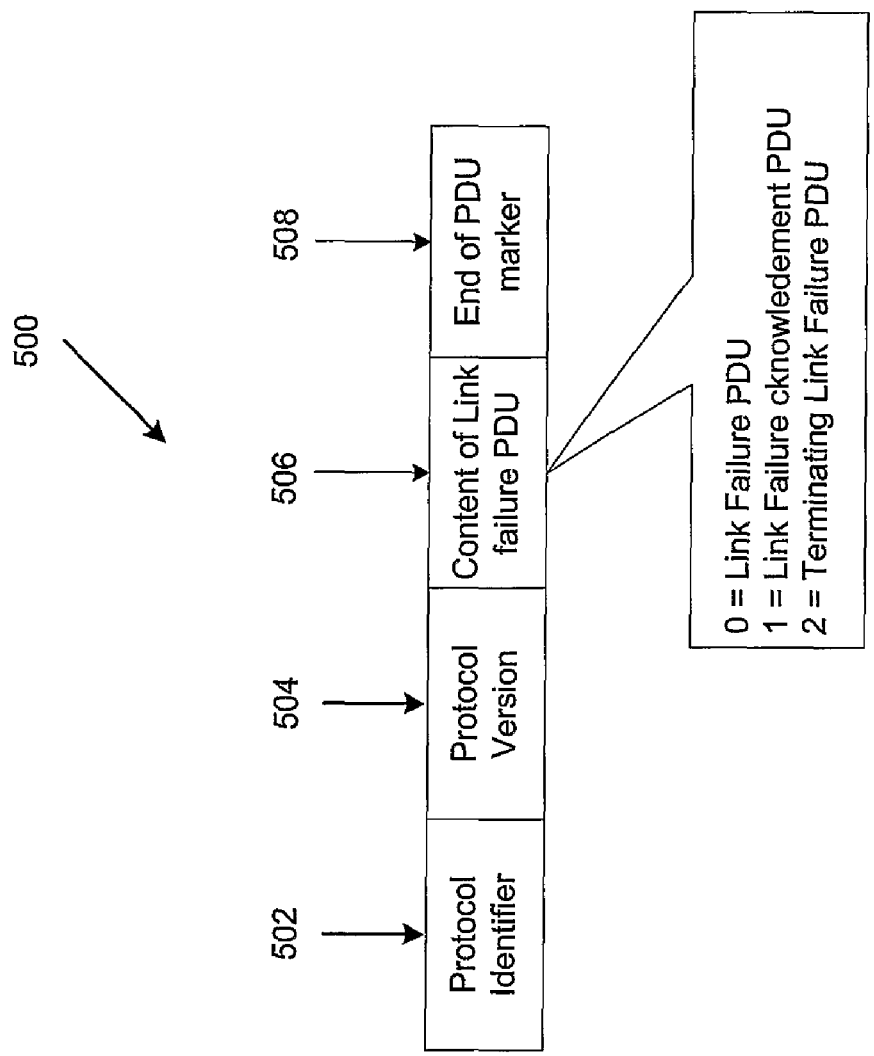
FIG. 5 depicts a block diagram of Link Failure Terminating Packet Data Unit, according to an embodiment of the present invention.
Figure 6:
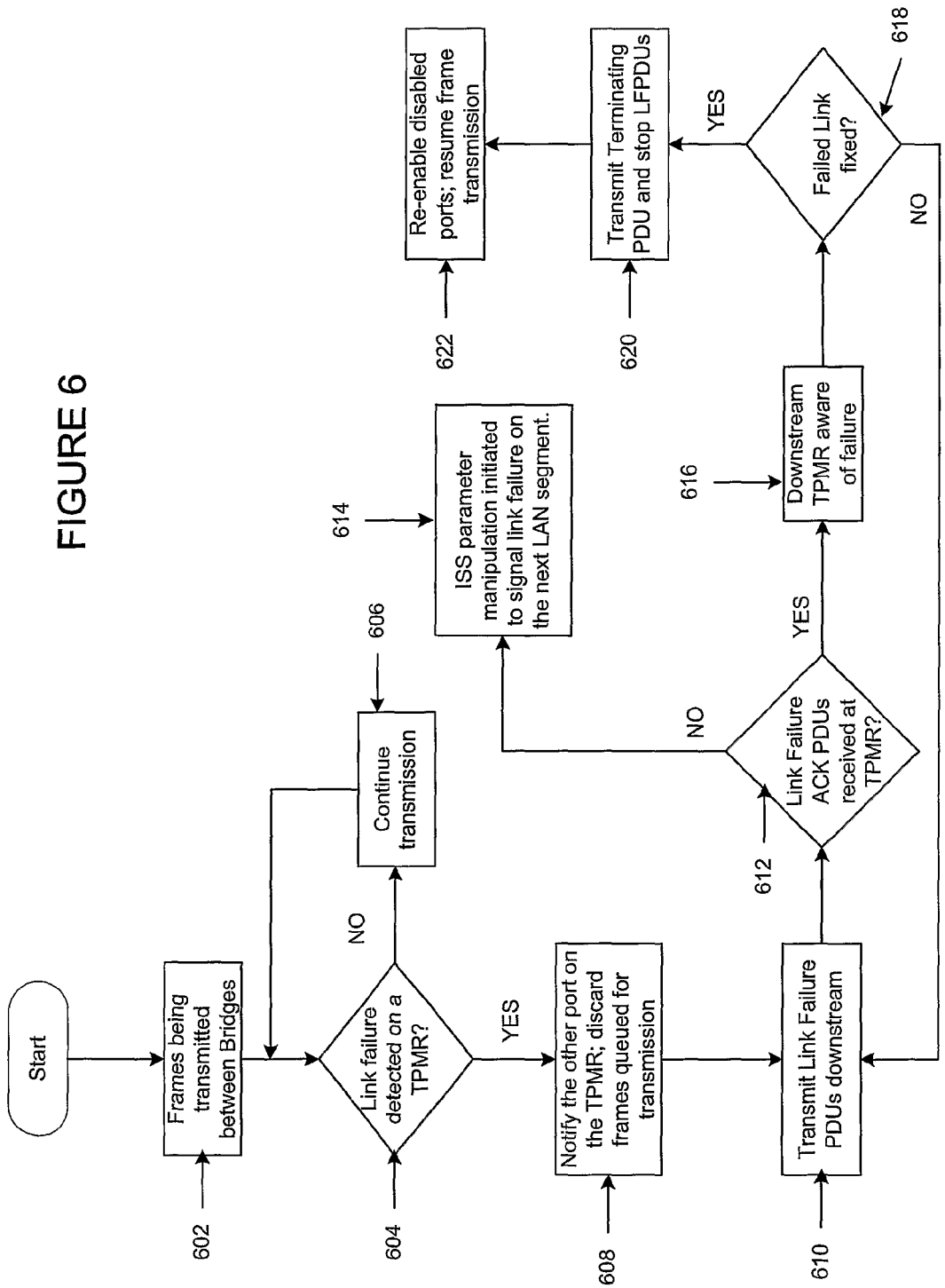
FIG. 6 depicts a method for re-enabling disabled TPMRs, according to an embodiment of the present invention.

This variable takes the Boolean value TRUE if, for the Port associated with the state machine, either of the following are true;

1. The MAC has been administratively disable (i.e., MAC_Enabled is FALSE, (see 6.4.2 in IEEE 802.1Q-2005) or
2. The entity providing the service is not capable to transmitting and receiving frames.
The value of this variable is otherwise FALSE.
forceOutDisabled
   This is a Boolean variable that is used to force the state of the downstream Port (i.e., the Port not associated with the state machine) to the disabled stated by overriding the MAC_Enabled parameter for the Port (6.4.2 in IEEE802.1Q-2005).
   If the value of forceOutDisabled is TRUE, the value of the MAC_Enabled parameter for the Port is FALSE, regardless of the value set by management operation. If the value of forceOutDisabled is FALSE, the value of the MAC_Enabled parameter for the Port (6.4.2 in IEEE802.1Q-2005) is whatever value has been set by management operation.
Start Ifp_timer
   This procedure initializes the Ifp_timer with the value if_timer_period.
Stop Ifp_timer
   This procedure stops the Ifp_timer by setting its value to zero.
Ifp_timer!
   This is the timer expiry event for the Ifp_timer, occurring when the Ifp_timer is decremented to zero.
NOTE—A stop Ifp_timer operation does not generate a Ifp_timer! event.
Ifp_fail_timer
   Ifp_fail_timer is the timer variable that is used to detect the absence of TPMR link failure ACK PDUs. The timer is started, i.e., initialized, with a starting value determined by the current value of Ifp_timer_period (3.1.6.5); the timer then decrements on each timer tick until its value reaches zero, at which point a timer expiry event is generated. The timer can be stopped by setting its value to zero
.Start Ifp_fail_timer
   This procedure initializes the ifp_fail_timer with 2.5 times the value of If_timer_period.
Stop Ifp_fail_timer
   This procedure stops the Ifp_fail_timer by setting its value to zero.
Lfp_fail_timer!
   This is the timer expiry event for the Ifp_fail_timer, occurring when the Ifp_timer is decremented by zero.
NOTE—A Stop Ifp_fail_timer operation does not generate a Ifp_fail_timer! event.
TX_ifpdu
   This procedure causes a TPMR link failure PDU, to be transmitted on the port of the TPMR not associated with the instance of the state machine. The destination address used for the TPMR Link Failure PDU transmission shall be a group MAC address specified in Tables 8-1 and 8-2 of *IEEE Std. 802.1Q-2005, IEEE Standards for Local and Metropolitan Area Networks: Virtual Bridged Local Area Networks*. This address is not filtered by TPMRs and the destination address is stopped by VLAN aware Bridges and Provider bridges but not by TPMRs The source address shall be the individual MAC address of the transmission Port of the TPMR.
X_If-ack_pdu
   This procedure causes a TPMR link failure acknowledgement PDU, to be transmitted on the port of the TPMR associated with the instance of the state machine. The destination address used for the PDU transmission shall be a group MAC address specified in Tables 8-1 and 8-2 of *IEEE Std. 802.1Q-2005, IEEE Standards for Local and Metropolitan Area Networks: Virtual Bridged Local Area Networks*. This address is not filtered by TPMRs. The source address shall be the individual MAC address of the transmission Port of the TPMR.
Tx_Ifpdu_T
   This procedure causes a TPMR Link Failure Terminating PDU, to be transmitted on the port of the TPMR not associated with the instance of the state machine. The destination address used for the PDU transmission shall be a group MAC address specified in Tables 8-1 and 8-2 of *IEEE Std. 802.1Q-2005, IEEE Standards for Local and Metropolitan Area Networks: Virtual Bridged Local Area Networks*. This address is not filtered by TPMRs. The source address shall be the individual MAC address of the transmission Port of the TPMR."
   FIG. 5 illustrates a high-level block diagram of the structure of a TPMR link failure PDU in accordance with an embodiment of the present invention. Each TPMR link failure PDU (LFPDU) 500 consists of the following elements, appearing in the following order in the PDU:
   Protocol Identifier 502 value shall be the TPMR link failure Ether Type value to be identified later;
   Protocol Version Identifier 504 shall be 0x00 for this version of the protocol;
   Content of link failure PDU 506 defines three opcodes as the content; and
   End of PDU marker 508 value shall be 0x00.
Encoding of Protocol Identifier
   In LANs that provide native support for protocol identification using EtherType values, such as IEEE Std 802.3 LANs, the protocol identifier value is encoded in two octets. In LANs that provide support for protocol identification by means of IEEE Std 802.2 LLC encapsulation, the SNAP encoding defined in subclause 10.5 of IEEE Std 802, is used to encode the protocol identifier.
Encoding of Protocol Version
   The protocol version is encoded as a single octet binary number.
Encoding of Opcode
   The opcode is encoded as a single octet binary number that can take the following values:
   an opcode value of 0 indicates that the PDU is a Link Failure PDU;
   an opcode value of 1 indicates that the PDU is a Link Failure Acknowledgement PDU; and
   an opcode value of 2 indicates that the PDU is a Link Failure Terminating PDU.
Encoding of End of PDU Marker
   The end of PDU marker is encoded as a single octet binary number.
   FIG. 6 depicts a method for re-enabling disabled TPMRs, according to an embodiment of the present invention. The process begins with frames being transmitted between Bridges in a TPMR/Bridge network (step 602). A recurring determination is made by each TPMR whether a link failure has been detected (step 604). If no link failure is detected, the frame transmission continues as usual. However, if a link failure is detected, the side opposite the side of the TPMR that detects the failure is notified and incoming frames that are queued for transmission are discarded (step 608). The connected side (side opposite) of the TPMR begins to transmit Link Failure PDUs downstream.
   A determination is made whether Link Failure ACK PDUs are received at a TPMR (step 612). If no ACK PDU is received within a certain period the link failure protocol state machines employ ISS parameter manipulation (step 614) in order to signal link failure on the next LAN segment. This means that the MAC_Enabled parameter of the other port is set to FALSE.

If the Link Failure ACK PDUs are received at a downstream TPMR then the downstream TPMRs are aware of the link failure (step 616). The network is monitored to determine if the failed link has been fixed (step 618). The process moves to step 610 where the Link Failure PDUs are continuing to be transmitted downstream. However, if the failed link is fixed a Link Failure Terminating PDU is transmitted as the Link Failure PDUs are stopped (step 620). The disabled ports are now re enabled and frame transmission resumes (step 622).

The current invention provides a mechanism that would allow a disabled downstream port to be re-enabled if the failure was the result of a propagating link failure PDU that reached the disabled downstream port that is on a device that does not enable the capability of responding to link failure PDUs. As such it achieves fast recovery propagation and improves the overall service availability.

Abbreviations
IEEE Institute of Electrical and Electronics Engineers
ISS Internal Sublayer Service
LAN Local Area Network
LLC Logical Link Control
LFPDU Link Failure PDU
LFTPDU Link Failure Terminating PDU
MAC Medium Access Control
PDU Protocol Data Unit
SNAP Sub-Network Access Protocol
TPMR Two Port MAC Relay

The invention claimed is:

1. In a network, a method of enabling a disabled port on a device that relays Medium Access Control (MAC) frames, when the port is disabled due to operation of a link failure propagation protocol, the method comprising the steps of:
    setting a Link Failure notification mechanism in the device utilizing Internal Sub-layer Service (ISS) status parameters;
    detecting a link or port failure on a first port of the device; disabling the first port by the device; notifying a second port of the device of the link or port failure;
    periodically transmitting Link Failure Packet Data Units (LFPDUs) through the second port of the device to a downstream peer entity;
    determining by the device, whether Acknowledgement PDUs (ACK PDUs) are received from the downstream peer entity in response to the periodically transmitted LFPDUs;
    when ACK PDUs are not received from the downstream peer entity, initiating the ISS Link Failure notification mechanism to manipulate ISS parameters to signal link failure on the next network segment;
    monitoring the failed link or port by the device to detect whether the link or port failure is repaired;
    responsive to detecting that the link or port failure is repaired: stopping the periodic transmitting of LFPDUs by the device; transmitting a Link Failure Terminating Protocol Data Unit (LFTPDU) from the device to the downstream peer entity to signal that the link or port failure is repaired; and re-enabling the first port.

2. The method of claim 1, wherein the Link Failure Protocol Data Unit comprises:
    a Protocol Identifier;
    a Protocol Version Identifier;
    a Content of Link Failure PDU; and
    an End of PDU marker.

3. The method of claim 2, wherein the Protocol Identifier is encoded:
    in two octets in Local Area Networks (LANs) that provide native support for protocol identification using Ether-Type values; and
    using Sub-Network Access Protocol (SNAP) encoding in LANs that provide support for protocol identification by means of a header that includes a SNAP header.

4. The method of claim 2, wherein the Protocol Version Identifier is encoded as a single octet binary number.

5. The method of claim 2, wherein the Content of Link Failure PDU is encoded as a single octet binary number that can take any of the following values:
    an opcode value of 0 that indicates the PDU is a periodic Link Failure PDU;
    an opcode value of 1 that indicates the PDU is a Link Failure Acknowledgement PDU; and
    an opcode value of 2 that indicates the PDU is a Link Failure Terminating PDU.

6. The method of claim 2, wherein the End of PDU marker includes a value of 0x00.

7. The method of claim 1, further comprising the step of re-enabling the downstream peer entity upon receipt of the Link Failure Terminating PDU at the downstream peer entity.

8. The method of claim 1, further comprising the step of notifying a downstream peer entity that is not implementing the link failure protocol that the links connecting a chain of devices are working.

9. The method of claim 1, wherein the downstream peer entity is connected to bridges either directly or through a chain of two port systems.

10. The method of claim 1, wherein the device is a device with two ports that relays MAC frames, and the device is one of a Two Port MAC Relay, a bridge, and a router.

11. In a network, a system for enabling a disabled port on a device that relays Medium Access Control (MAC) frames when the port is disabled due to operation of a link failure propagation protocol, the system comprising:
    a state machine for setting a Link Failure notification mechanism in the device utilizing Internal Sub-layer Service (ISS) status parameters;
    a detector for detecting a link or port failure on a first port of the device;
    means for disabling the first port by the device in response to detecting the link or port failure;
    a notification device for notifying a second port of the device of the link or port failure;
    a transmitter/receiver for periodically transmitting Link Failure Packet Data Units (LFPDUs) through the second port of the device to downstream devices;
    means for determining by the device, whether Acknowledgement PDUs (ACK PDUs) are received from the downstream devices in response to the periodically transmitted LFPDUs, wherein when ACK PDUs are not received from the downstream devices, the ISS Link Failure notification mechanism is adapted to manipulate ISS parameters to signal link failure on the next network segment;
    means for monitoring the failed link or port by the device to detect whether the link or port failure is repaired; and
    control means, responsive to detecting that the link or port failure is repaired, for stopping the periodic transmission of LFPDUs, for transmitting a Link Failure Terminating Protocol Data Unit (LFTPDU) to the downstream devices to signal that the link or port failure is repaired, and for re-enabling the first port.

12. The system of claim 11, wherein the Link Failure Terminating Protocol Data Unit comprises: a Protocol Identifier; a Protocol Version Identifier; a Content of Link Failure PDU; and an End of PDU marker.

13. The system of claim 12, wherein the Protocol Identifier is encoded:
- in two octets in Local Area Networks (LANs) that provide native support for protocol identification using Ether-Type values; and
- utilizing Sub-Network Access Protocol (SNAP) encoding in LANs that provide support for protocol identification by means of a header that includes a SNAP header.

14. The system of claim 12, wherein the Protocol Version Identifier is encoded as a single octet binary number.

15. The system of claim 12, wherein the Content of Link Failure PDU is encoded as a single octet binary number that can take any of the following values:
- an opcode value of 0 that indicates the PDU is a periodic Link Failure PDU;
- an opcode value of 1 that indicates the PDU is a Link Failure Acknowledgement PDU; and
- an opcode value of 2 that indicates the PDU is a Link Failure Terminating PDU.

16. The system of claim 12, wherein the End of PDU marker includes a value of 0x00.

17. The system of claim 11, further comprising means for re-enabling each of the downstream devices upon receipt of the Link Failure Terminating PDU at the downstream device.

18. The system of claim 11, wherein the device includes means for notifying a downstream device, which is not implementing the link failure protocol, that the links connecting a chain of devices are working.

19. The system of claim 11, wherein the device that relays MAC frames is one of a Two Port MAC Relay (TPMR), a bridge, and a router.

20. The system of claim 11, wherein each of the downstream devices is connected to bridges either directly or through a chain of two port systems.

* * * * *